(12) United States Patent
Verza

(10) Patent No.: US 12,114,111 B2
(45) Date of Patent: Oct. 8, 2024

(54) PATCH PANEL WITH INTERCHANGEABLE FRONT PLATE

(71) Applicant: DXMA Hong Kong Limited, Hong Kong (CN)

(72) Inventor: Damiano Verza, Milton Keynes (GB)

( * ) Notice: Subject to any disclaimer, the term of this patent is extended or adjusted under 35 U.S.C. 154(b) by 420 days.

(21) Appl. No.: 17/436,633

(22) PCT Filed: Mar. 5, 2019

(86) PCT No.: PCT/IB2019/051767
§ 371 (c)(1),
(2) Date: Sep. 6, 2021

(87) PCT Pub. No.: WO2020/178618
PCT Pub. Date: Sep. 10, 2020

(65) Prior Publication Data
US 2022/0159353 A1 May 19, 2022

(51) Int. Cl.
*H04Q 1/02* (2006.01)
*G02B 6/44* (2006.01)
*H01R 13/518* (2006.01)

(52) U.S. Cl.
CPC ......... *H04Q 1/133* (2013.01); *G02B 6/44526* (2023.05); *H01R 13/518* (2013.01); *H04Q 1/09* (2013.01)

(58) Field of Classification Search
CPC .............................. G02B 6/44526; H04Q 1/02
See application file for complete search history.

(56) References Cited

U.S. PATENT DOCUMENTS

| 5,195,288 | A | * | 3/1993 | Penczak | H02G 3/185 52/220.1 |
| 6,199,929 | B1 | * | 3/2001 | Hansch | B62D 33/033 296/10 |
| 2009/0245746 | A1 | * | 10/2009 | Krampotich | G02B 6/4452 385/135 |
| 2010/0255716 | A1 | * | 10/2010 | Frey | H04Q 1/09 439/540.1 |
| 2015/0056843 | A1 | * | 2/2015 | Tillmanns | H01R 13/508 439/370 |
| 2019/0004268 | A1 | | 1/2019 | Vogel | |
| 2021/0112316 | A1 | * | 4/2021 | Liu | H04Q 1/13 |

FOREIGN PATENT DOCUMENTS

JP    2005209387 A   *   8/2005

* cited by examiner

*Primary Examiner* — Eric Wong
(74) *Attorney, Agent, or Firm* — Themis Law

(57) ABSTRACT

A patch panel has a box-shaped structure that includes a front panel having a L-shaped profile with two orthogonal walls joined together along a common longer edge. On each of the two walls of the front panel there are holes or openings for screws or other elements that secure the front panel to a tray and to side walls of the box-shaped structure, and on each of the two walls of the front panel there are holes or openings adapted to house sockets and/or adapters. The front panel can be secured to a sliding tray so that one of the walls of the front panel is adherent to the sliding tray and the other one of the walls of the front panel is orthogonal to the sliding tray, closing a front opening of the box-shaped structure when the sliding tray is completely inserted into the box-shaped structure.

5 Claims, 3 Drawing Sheets

Figure 1:
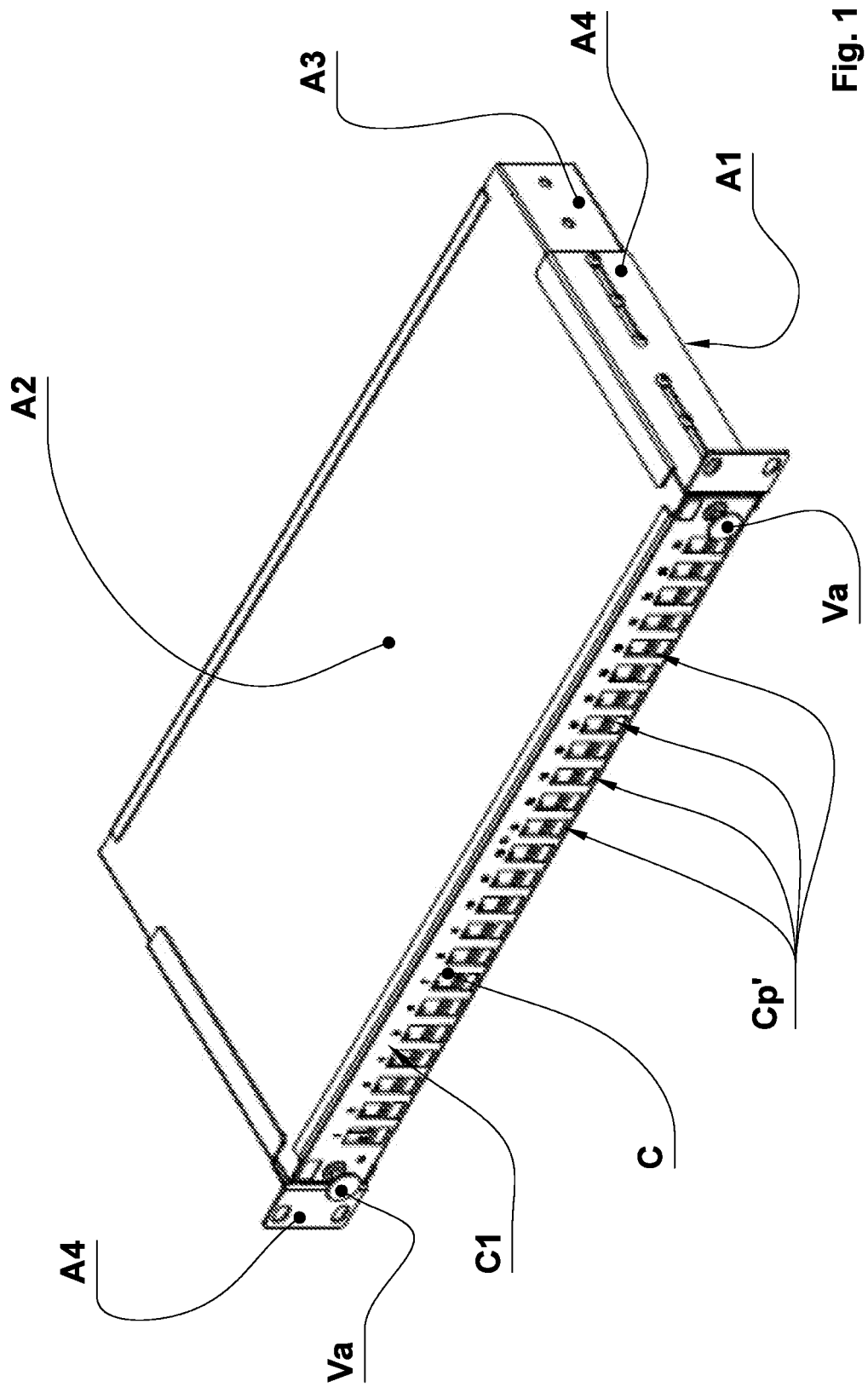

  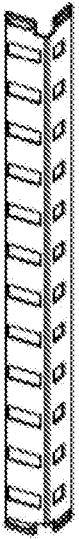
Fig. 3d  Fig. 3e  Fig. 3f
  
Fig. 3a  Fig. 3b  Fig. 3c

PATCH PANEL WITH INTERCHANGEABLE FRONT PLATE

This patent relates to racks and equipment for data processing centers and in particular concerns a new patch panel for connecting and routing circuits with an interchangeable front panel.

In computerized structures, data processing centers are well known, once called data processing centers based on punched cards and tapes and now called data centers.

Data centers host different equipment such as servers, memory units, backup units, modems, control consoles, and so on.

All these devices are housed in special cabinets called racks.

The aforementioned devices are connected to each other and to other remote devices by means of cables composed of single or multiple electrical conductors or optical fibers.

Typically, the connections are made using local area network cables or fiber optical connection cables, however USB, coaxial, or other types of connections are also used for low priority or low speed connections or for the connection of different signals.

So-called patch panels are used to organize, simplify and standardize all the aforementioned connections for the easy monitoring, interconnection, and testing of circuits. They consist of a box-shaped metal structure having multiple connection sockets or adapters on the front side.

Depending on the type of connections required, RJ45, optical, VGA, and other kinds of sockets are used.

The front of these patch panels are equipped with openings in which the appropriate socket or adapters are installed.

Each type of socket or adapter has its own shape and space requirements and can be inserted and housed in a specific opening, which must have a specific shape, dimensions, and characteristics suited to guarantee the proper, stable and non-mobile housing of the socket in question.

Patch panels equipped with RJ45 sockets suitable only for local area network, metropolitan area network, or even global area network cables are known in the prior art.

Patch panels equipped with optical sockets or adapters suitable only for connecting optical cables are also known in the prior art. Patch panels with optical sockets or adapters often house splice-tray devices.

The aforementioned patch panels involve the production and storage by the manufacturer, as well as the purchase by the customer of a patch panel for each type of connection socket.

Patch panels with interchangeable front panels are known in the prior art where depending on the type of sockets or adapters needed, it is sufficient to apply the appropriate front panel to the box-shaped structure.

Said patch panels, with an interchangeable front panel, nonetheless involve the production and storage by the manufacturer, as well as the purchase by the customer of a front panel for each type of connection socket.

The object of the present patent is a new patch panel having an interchangeable front panel, each front panel having two different types of connection sockets.

One purpose of the new patch panel is to enable the installation of different sockets and/or adapters.

Another purpose of the new patch panel is to enable the alternative installation of two types of sockets or adapters without replacing any part of the new patch panel.

Still another purpose of the new patch panel is to enable the installation of two types of sockets or adapters of a type not provided for by simply replacing a single component of the new patch panel.

Yet another purpose of the new patch panel is to enable the installation of different types of sockets or adapters while maintaining substantially the same main structure.

A further purpose of the new patch panel is to limit the number of parts required for the installation of different sockets or adapters.

The new patch panel comprises a box-shaped structure, a sliding tray, and an interchangeable front panel.

Said box-shaped structure comprises a lower wall, an upper wall, and two side walls.

The side walls of said box-shaped structure have wings or other similar elements secured to them for securing the new patch panel on the rack.

(Note: indicating sizes may be limiting to those sizes, not indicating sizes results in a broader scope since the device is not limited by any other non-standard or future size).

The sliding tray is housed on top of the lower wall and inside the box-shaped structure. This tray has dimensions substantially equal to the lower wall of the box-shaped structure and is suited to slide from a position in which said tray is completely housed inside the box-shaped structure, to a position in which said tray is almost completely extracted from the front side of the box structure.

The interchangeable front panel is removably applied on the front edge of said sliding tray.

This interchangeable front panel substantially consists of an L-shaped profile having two walls joined together along a common longer edge.

At the ends of said two walls of the interchangeable front panel there are holes, openings, or the like to secure it to the tray and to the side walls of the box-shaped structure.

In particular, one wall of the interchangeable front panel is suited to be installed tightly against and adherent to the front part of said sliding tray while the other front panel wall is suited to be placed on the front part of the box-shaped structure of the new patch panel.

Said holes, openings or other fastening elements are placed near the two ends of said interchangeable front panel in question.

On each of the two walls of the interchangeable front panel there are holes or openings suited to house optical sockets or adapters.

In particular, the holes or openings on one wall of the interchangeable front panel are different from the holes or openings on the other wall of the same interchangeable front panel.

For example, the holes or openings on one wall of said interchangeable front panel may be suited to house RJ45 sockets, while the holes or openings on the other wall of said interchangeable front panel may be suited to house optical sockets or adapters for LC/SC/FC/ST/E2000/MPO/MTP/HDMI connections.

The patch panel of the invention also envisages interchangeable front panels with different combinations of holes or openings on both walls.

Moreover, the holes and openings on one same wall of the front panel may also be different from each other, for example some could be for housing RJ45 sockets and others for housing optical adapters.

The new patch panel as described above has considerable advantages.

Given that the new patch panel is equipped with an interchangeable front panel, it enables the installation of two different types of sockets and/or adapters: installing the interchangeable front panel in a first position it is possible to install sockets or adapters of a first type, while installing the interchangeable front panel in a second position it is possible to install sockets or adapters of a second type.

To change the position of the interchangeable front panel simply follow a few easy steps:
- separate the interchangeable front panel from the box-shaped structure of the patch panel,
- remove the front panel and the tray from the patch panel enough to expose the connection elements between the interchangeable front panel and the tray itself,
- separate the interchangeable front panel from the sliding tray,
- change the position of the interchangeable front panel and reconnect it to the sliding tray,
- slide the sliding tray with the interchangeable front panel in the new position until the interchangeable front panel adheres to the box-shaped structure of the patch panel,
- secure the interchangeable front panel to the box-shaped structure of the patch panel.

If it is necessary to install sockets or adapters which require different housing holes or openings from those provided for the aforementioned interchangeable front panel, simply follow the procedure above installing another interchangeable front panel with holes or openings suited for the sockets or adapters to be installed.

An embodiment of the invention is presented, by way of a non-limiting example, in the attached drawings.

Figure 2:
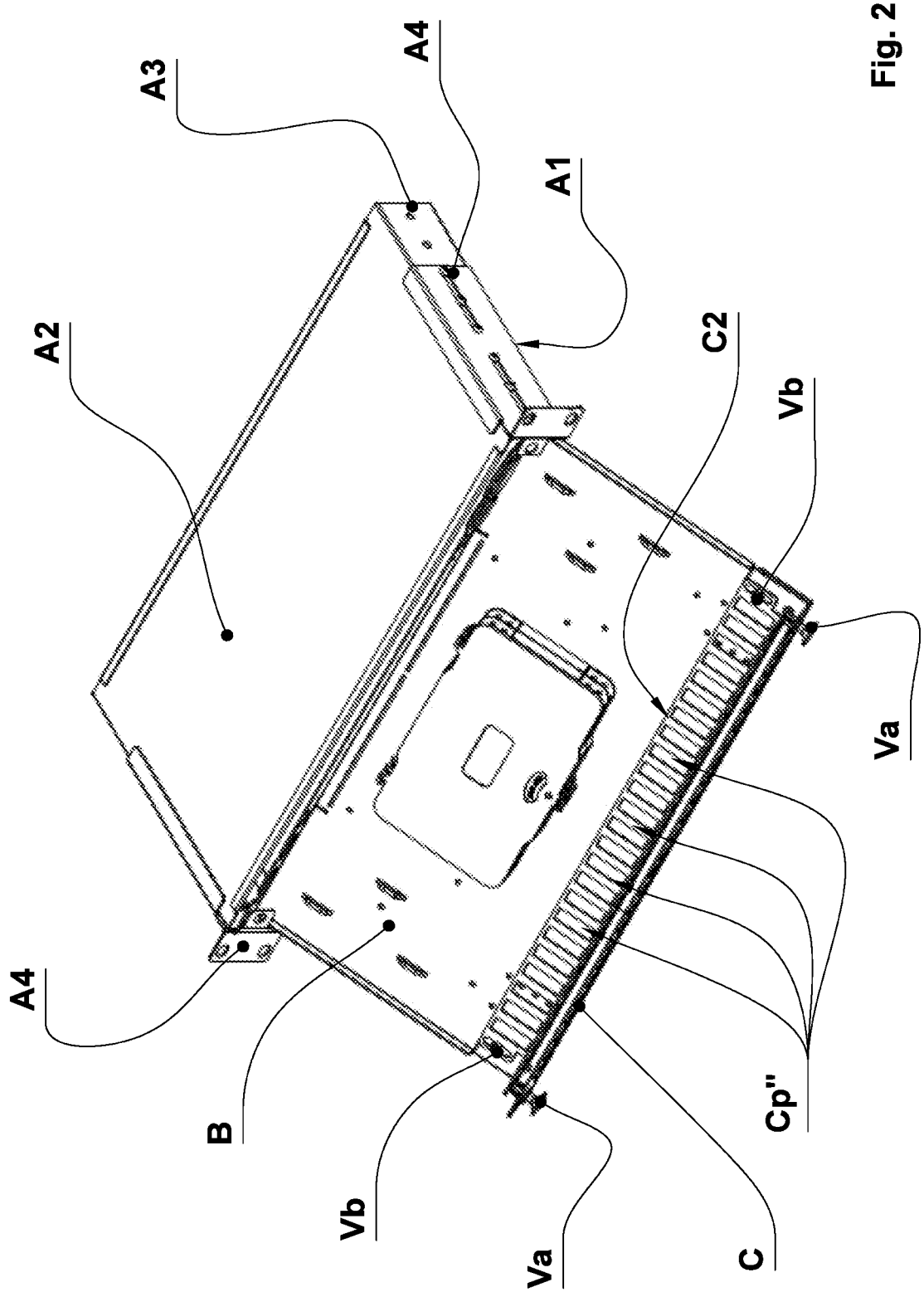

In FIG. 1 and in FIG. 2 two views are shown of the new patch panel comprising:
- a box-shaped structure (A)
- a sliding tray (B),
- a front panel (C).

Said box-shaped structure (A) comprises a lower wall (A1), an upper wall (A2), two side walls (A3).

On said side walls (A3) of the box-shaped structure (A) there are wings (A4) to secure the new patch panel on the rack structure.

Said sliding tray (B) is on the lower wall (A1) and inside the box-shaped structure.

Said tray (B) is suited to slide inside the box-shaped structure (A) from a position in which the said (B) is housed completely inside the box-shaped structure (A), as shown in FIG. 1, to a position in which the tray (B) is almost completely extracted from the front side of the box-shaped structure (A), as shown in FIG. 2.

Said front panel (C) is removably applied on the front end of said tray (B).

Said front panel (C) consists substantially of a profile having two walls (C1, C2) joined together along a common longer edge (Cm) forming an L-shaped profile. At the ends of said two walls (C1, C2) of said front panel (C) there are holes or openings (Cv', Cv") for screws (Va, Vb) or other elements to secure them to said tray (B) and to the side walls (A3) of the box-shaped structure (A).

On each of the two walls (C1, C2) of said front panel (C) there are holes or openings (Cp', Cp") suited to house sockets and/or adapters.

In particular, the holes or openings (Cp') present on one wall (C1) of said front panel (C) are different from the holes or openings (Cp") present on the other wall (C2) of said front panel (C).

FIGS. 3a, 3b, 3c, 3d, 3e, 3f show different embodiments of front panels (C).

To change the installation position of the front panel (C) simply proceed as follows:
- separate the interchangeable front panel (C) from the box-shaped structure (A) of the patch panel by unscrewing the relative screws (Va),
- remove the tray (B) from the patch panel enough to expose the connecting screws (Vb) between the interchangeable front panel (B) and the tray itself (B),
- unscrew the screws (Vb) so as to free the interchangeable front panel (C) from the sliding tray (B),
- change the position of the interchangeable front panel (C) and secure it again to the sliding tray (B),
- slide the sliding tray (B) with the new interchangeable front panel (C) in the new position until the interchangeable front panel (C) adheres to the box-shaped structure (A) of the patch panel,
- secure the interchangeable front panel (C) to the box-shaped structure (A) of the patch panel by tightening the relative screws (Va).

If it is necessary to install sockets or adapters which require different housing holes or openings from those provided for on the aforementioned interchangeable front panel (C), simply implement the procedure above this time installing another interchangeable front panel with holes or openings (Cp', Cp") suited for the sockets or adapters to be installed.

Therefore, with reference to the above description and the attached drawings, the following claims are made.

The invention claimed is:

1. A patch panel, comprising:
a box-shaped structure comprising a lower wall, an upper wall, and two side walls, a sliding tray along said lower wall of said box-shaped structure, and a front panel configured to be secured to said sliding tray,
wherein said front panel has a L-shaped profile defined by a first and a second wall that are orthogonal to each other and join together along a common longer edge,
wherein on each of said first and said second orthogonal walls of said front panel there are holes or openings adapted to receive fasteners so as to secure said front panel to said tray and to the side walls of the box-shaped structure,
wherein, on each of the first and said second orthogonal walls of said front panel, there are second holes or openings housing sockets and/or adapters, and
wherein said front panel is configured to be secured to said sliding tray so that a first one of the orthogonal walls of said front panel is adherent to said sliding tray and a second one of the orthogonal walls of said front panel is orthogonal to the sliding tray and closes a front opening of the box-shaped structure when said sliding tray is completely inserted in the box-shaped structure.

2. The patch panel, according to claim 1, wherein said second holes or openings present on the first wall of said front panel house a specific type of socket or adapter, and wherein said second holes or openings present on the second wall of said front panel house a different type of socket or adapter.

3. The patch panel, according to claim 1, wherein said second holes or openings present on one or both of the first and the second walls of said front panel are house different types of sockets and/or adapters.

4. The patch panel according to claim 1, wherein said front panel is removably connected to said sliding tray and/or to said box-shaped structure.

5. The patch panel according to claim 1, further comprising wings or other side elements on said side walls of said box-shaped structure designed to be secured to a rack structure.

\* \* \* \* \*